C. A. SLOCUM.
TRACTOR WHEEL.
APPLICATION FILED JAN. 30, 1919.
1,338,105. Patented Apr. 27, 1920.
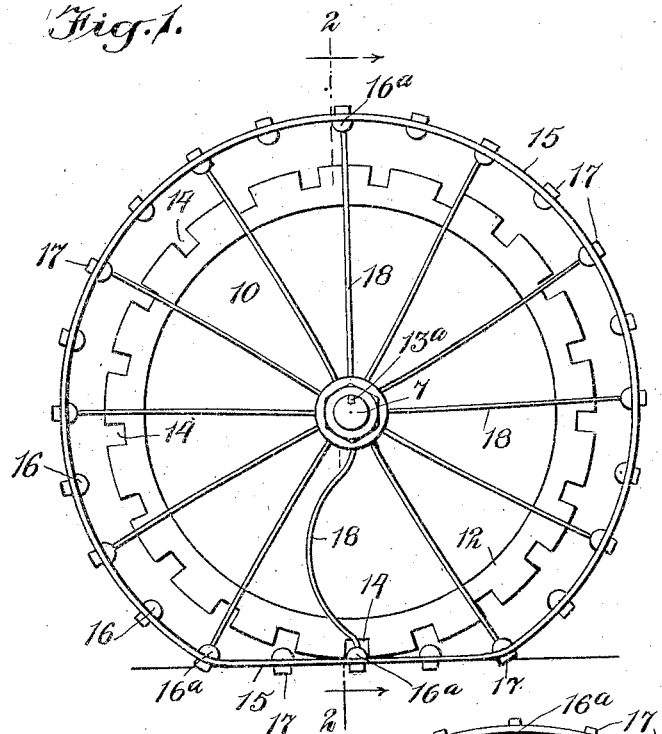
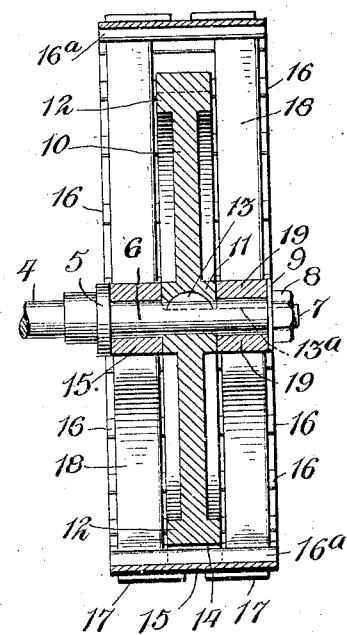
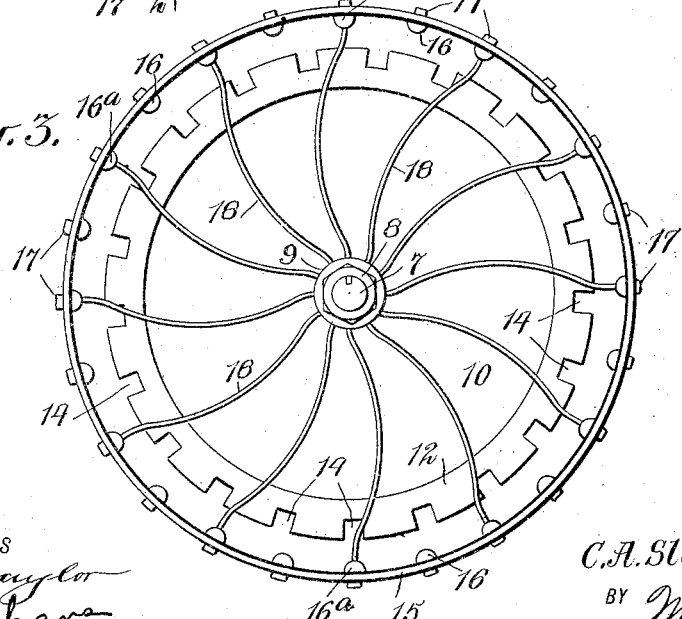
WITNESSES
INVENTOR
C. A. Slocum
BY
ATTORNEYS

UNITED STATES PATENT OFFICE.

CONRAD A. SLOCUM, OF HASWELL, COLORADO.

TRACTOR-WHEEL.

1,338,105.    Specification of Letters Patent.    Patented Apr. 27, 1920.

Application filed January 30, 1919. Serial No. 274,002.

*To all whom it may concern:*

Be it known that I, CONRAD A. SLOCUM, a citizen of the United States, and a resident of Haswell, in the county of Kiowa and State of Colorado, have invented a new and Improved Tractor-Wheel, of which the following is a full, clear, and exact description.

My invention relates to tractor wheels and related appliances, my more particular purpose being to provide a tractor wheel made up of parts movable relatively to each other and so arranged as to give the tractor wheel a comparatively large bearing surface where it engages the ground, in order to increase the grip of the wheel upon the ground and reduce the packing of the soil.

More particularly stated I seek to produce a tractor wheel comprising a revoluble but rigid inner member surrounded by a revoluble but flexible outer member, the latter being so arranged that by distortion of its shape while in action it will spread out upon the ground and thus give a relatively large bearing surface, and consequently a better tractile effect will be produced.

Reference is made to the accompanying drawing forming a part of the specification and in which like reference characters indicate like parts throughout the several figures.

Figure 1 is a side elevation of the device as it appears when in engagement with the ground.

Fig. 2 is a section on the line 2—2 of Fig. 1 looking in the direction of the arrows.

Fig. 3 is a side elevation of the device as it appears when raised out of engagement with the ground.

A tractor wheel is shown as mounted upon an axle 4 and carries a collar 5 secured upon it and revoluble with it. The axle also carries a spindle 6 provided with a portion 7 of reduced diameter, and mounted upon this portion is a nut 8 and a washer 9.

A wheel 10 is carried by the spindle 6 and is mounted substantially midway between the ends thereof as indicated in Fig. 2. This wheel is provided with a hub 11 and with a rim 12. The hub 11 is secured by a key 13 to the spindle 6 so that the wheel 10 turns with a positive motion caused by rotation of the axle 4. The key 13 is provided with a portion 13ª extending parallel with the axis of the spindle 6 and sunken into the spindle as indicated by dotted lines in Fig. 2. The rim 12 is provided with notches 14 spaced equidistant, shown more particularly in Figs. 1 and 3. Encircling the wheel 10 is a spring rim 15 having normally a circular form as indicated in Fig. 3 but adapted to be distorted by its own weight and by the position of the wheel 10 as indicated in Fig. 1. The spring rim 15 carries a number of anchor bars 16 each disposed parallel with the geometrical axis of the spring rim and secured rigidly to this rim. The spring rim also carries a number of tread lugs 17 for engaging the ground.

A number of metallic springs 18 each bent slightly into S-shape are secured at their outer ends to the spring rim and radiate inwardly therefrom. These springs are arranged in two groups as indicated in Fig. 2 and at their inner ends are secured a pair of annular hubs 19 which are mounted loosely upon the spindle 6.

The parts are so mounted and arranged that when the tractor wheel as a whole rests upon the ground, as indicated in Fig. 1, the spring rim is distorted, as shown, so as to increase the portion of it which engages the ground and thus to virtually increase its bearing surface relatively to the ground. This prevents the wheel from slipping.

In this connection it should be stated that ordinarily a tractor wheel carries a considerable weight and because of this fact it has a tendency to pack the ground immediately under the wheel, thus rendering the ground exceedingly smooth, not only that but owing to the area of contact between the ordinary tractor wheel and the ground it is difficult to bring many of the tractor lugs into gripping engagement with the ground. By my arrangement, however, owing to the distortion of the spring rim 15, quite a number of the tread lugs 17 are brought into engagement with the ground and even forced slightly thereinto.

The operation of my device is as follows: The parts being assembled and arranged as shown and described and power being applied to the axle 4 so as to turn the same, the wheel 10 is turned with a positive motion. The weight of the axle 4 and parts carried by it causes the springs 18 to change form, as indicated more particularly in Fig. 1, these springs tending to straighten whenever and wherever they are subjected to the greatest pulling strain, and tending to bend more abruptly at points where they are compressed endwise, as indicated in the lower portion of Fig. 1. The net result is that these springs so press the spring rim 15 downwardly and outwardly at the bottom of the device as to cause the increase in gripping power as above described between the tread lug 17 and the ground.

I do not limit myself to the particular mechanism here shown as variations may be made therefrom without departing from the spirit of my invention.

I claim:

1. A tractor wheel comprising a rigid member of annular form provided externally with notches, a resilient rim encircling said rigid member, anchor bars carried by said resilient rim and fashioned to fit into said notches, the resiliency of said rim normally tending to keep said anchor bars out of said notches except when said rigid member is forced toward a surface with which said resilient rim is in engagement.

2. A device of the character described comprising a driving wheel, made rigid and provided upon its periphery with notches, a rim encircling said driving wheel and made of resilient material, a plurality of anchor bars carried by said rim and fitting into said notches, a plurality of leaf springs secured to said rim and extending radially inwardly therefrom, and a hub connected with the inner ends of said leaf springs.

3. A device of the character described comprising a rigid wheel provided upon its outer edge with notches extending parallel with its axis, a rim made of resilient material and encircling said wheel, a shaft extending through the middle of said wheel, a pair of hubs mounted upon said shaft and disposed upon opposite sides of said wheel, leaf springs connected with said hubs and disposed in two groups, said groups being upon opposite sides of said wheel, and a rim made of resilient material and connected with the outer ends of said springs.

4. A device of the character described comprising a wheel provided upon its outer surface with notches, a rim encircling said wheel and made in a single integral piece of resilient material so that said rim possesses resiliency as well as flexibility, anchor bars mounted upon the inner surface of said rim for the purpose of moving into and out of said notches, leaf springs connected with said rim and extending inwardly therefrom, said leaf springs being disposed in two groups, one group being upon each side of said wheel, and an axle connected with all of said springs and extending through said wheel.

CONRAD A. SLOCUM.